United States Patent [19]
Ho et al.

[11] 3,786,445

[45] Jan. 15, 1974

[54] INTEGRATED MAGNETIC BUBBLE AND SEMICONDUCTOR DEVICE

[75] Inventors: Irving T. Ho; Jacob Riseman, both of Poughkeepsie, N.Y.

[73] Assignee: International Business Machines Corporation, Armonk, N.Y.

[22] Filed: July 3, 1972

[21] Appl. No.: 268,316

[52] U.S. Cl.340/174 TF, 340/174 EB, 340/174 HA, 340/174 S

[51] Int. Cl. .......... G11c 11/14

[58] Field of Search .......... 340/174 TF

[56] References Cited

UNITED STATES PATENTS

| | | | |
|---|---|---|---|
| 3,520,052 | 7/1970 | Hoffmann | 340/174 M |
| 3,701,125 | 10/1972 | Chang et al. | 340/174 TF |
| 3,702,991 | 11/1972 | Bate et al. | 340/174 TF |

OTHER PUBLICATIONS

IBM Technical Disclosure Bulletin – Vol. 13, No. 12, May 1971, pg. 3,704

IBM Technical Disclosure Bulletin – Vol. 13, No. 11, Apr. 1971, pg. 3,453–3,454

*Primary Examiner*—James W. Moffitt
*Attorney*—David M. Bunnell

[57] ABSTRACT

A magnetic bubble device and its associated read, write, propagation, sensing, addressing, driving, timing and control elements are combined in a unitary magnetic sheet-semiconductor structure.

3 Claims, 2 Drawing Figures

INTEGRATED MAGNETIC BUBBLE AND SEMICONDUCTOR DEVICE

BACKGROUND OF THE INVENTION

This invention relates generally to magnetic bubble devices and more particularly to a unitary magnetic material-semiconductor structure.

Magnetic bubble systems, useful for example in memory systems in which cylindrical magnetic bubble domains representing data to be stored are formed in a magnetic sheet of material such as an orthoferrite or garnet, are known in the art. The domains are maintained by a bias field which is oriented normal to the plane of the magnetic field and they can be propagated or moved along a selected path by a rotating magnetic field which is oriented in the plane of the magnetic material. The bubbles are propagated along patterns of a permeable material such as permalloy. I bar and T bar, herringbone, and angelfish are examples of patterns used for this purpose. The bubble movement is controlled by suitable gating arrangements as is known in the art. The domains are sensed at selected locations along the propagation path by methods such as inductive sensing, Hall effect sensing, magneto-optical sensing and magneto-resistive sensing. By sensing the presence or absence of magnetic domains or bubbles at selected locations, the data in the bubble memory can be read.

Heretofore, some of the necessary read, write, propagation, sensing, address, driving, timing and control elements needed to form a complete system have been incorporated onto the magnetic sheet. For example, copending applications Ser. No. 78,531, filed Oct. 16, 1970 and now U.S. Pat. No. 3,691,540 and Ser. No. 103,046 filed Dec. 31, 1970 and now U.S. Pat. No. 3,701,125 which are assigned to the present assignee. However, an external interface to electronic peripheral control and sensing circuitry has still been required which leads to problems and limitations relating to device manufacture, performance and reliability.

In accordance with this invention a magnetic bubble device is provided comprising a magnetic member in which magnetic domains can be formed and propagated, the member being directly joined in a laminar manner with a semiconductor member which carries the means for sensing the domains. This device provides for close proximity of the sensing and amplifying means and peripheral circuits with the magnetic domains. The close proximity provided by the structure of the invention has the purpose of decreasing noise and increasing speed. The device structure also permits the elimination of the electrical interface between the magnetic material and the semiconductor for the purpose of increasing reliability and ease of manufacture. The device structure also has the advantage in that the output of the assembly is directly compatible to present silicon technology which is employed in computers whereas the magnetic bubble memory alone requires an additional interface.

DETAILED DESCRIPTION

The foregoing and other objects, features and advantages of the invention will be apparent from the following more particular description of preferred embodiments of the invention as illustrated in the accompanying drawings.

Figure 1:
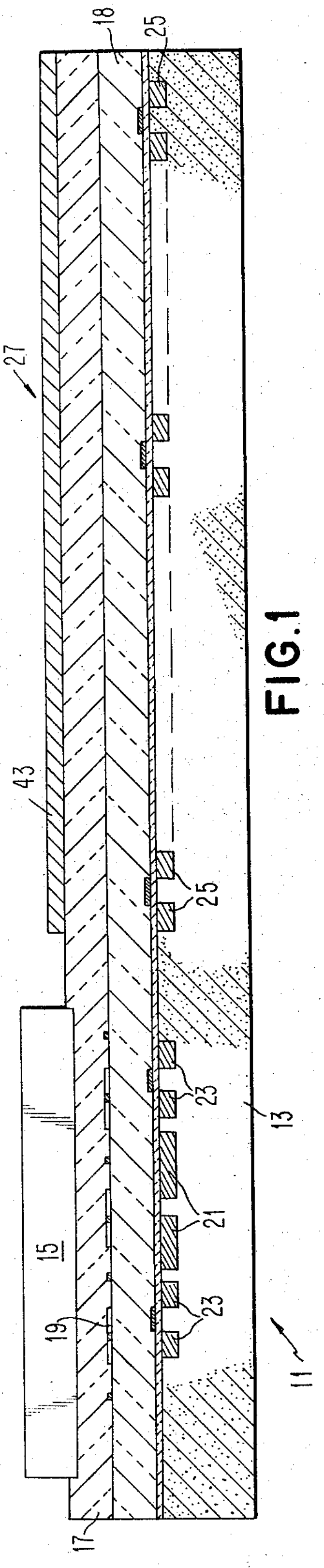
FIG. 1 is an elevational view, partly in section of an embodiment of the device of the invention.
Figure 2:
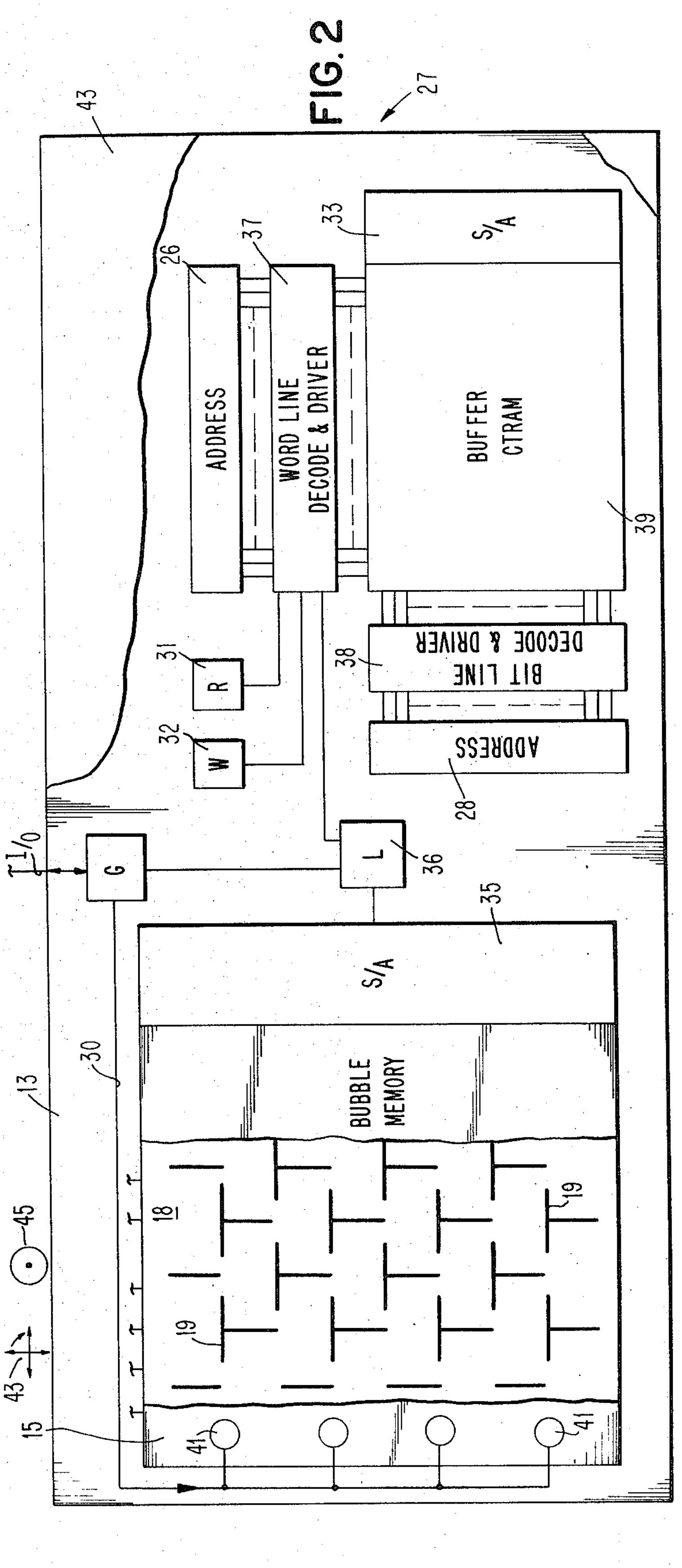
FIG. 2 is a partially schematic plan view of the device of FIG. 1.

FIGS. 1 and 2 illustrate a unitary magnetic-semiconductor memory device 11 which includes a member or chip 13 of semiconductor material for example of silicon, germanium or gallium arsenide and a magnetic chip or sheet 15 of orthoferrite or garnet which is carried by and bonded to quartz layer 17. Quartz layer 17 has a controlled thickness which is not critical with a magnitude for example, of from about 0.5 to 1.0 micron. A permalloy T bar path 19 is carried by quartz layer 18. The path 19 could have other configurations such as a herringbone or angel pattern. Also located in chip 13 are sensors 23 which are Hall effect transistors. Hall sensing is described, for example, in Journal of Applied Physics, Volume 41, Number 3, pages 1,169–1,170, March 1970, by W. Strauss and G. Smith. The Hall device regions are formed in the semiconductor chip 13 at the points where sensing is desired. The integrated nature of the structure 11 when using Hall effect sensing of bubbles avoids alignment and interface difficulties. Quartz layer 17, magnetic path 19, diffused conductor lines 21 and sensors 13 can be fabricated using well known conventional integrated circuit manufacturing techniques with layers of non-conductive material such as $SiO_2$ employed, where necessary, to provide electrical isolation between conductor lines. Other sensing means can be used such as magneto-resistive sensing.

Also incorporated into chip 13 and in close proximity to the sensors are sense amplifiers 25 which can be, for example field effect transistors to whose gates are fed the signals from sensors 23 as is conventional in the art.

Portion 27 of chip 13 has incorporated therein in the embodiment shown (in symbolic fashion) circuits for data input and output, reading, writing, decoding, and addressing, etc. as are well known in the art and the particular circuits chosen are optional in the practice of the present invention. In the embodiment shown a random access charge transfer semiconductor buffer memory 39 is included along with its associated read and write control circuits 31 and 32, address circuits 26 and 28, sense amplifier circuits 33, word line decode and driver circuits 37, bit line decode and driver circuits 38. Such memories are described, for example, in U. S. Pat. No. 3,585,613 and 3,387,286. Also formed in the semiconductor chip 13 are sense amplifier circuits 35 for the magnetic domains, input/output circuit 30, and other circuits and devices to operatively interconnect the memories such as latch 36 which also may be connected to or form part of sense amplifier 33. Such circuits and their fabrication by integrated circuit manufacturing techniques in or on a semiconductor member are well known to those skilled in the art. A permalloy shield 43 can be placed over the active portion 27 of the chip 13 if desired. The necessary bubble generators, such as rotating permalloy discs 41, the rotating propagating field 43 and the bias field 45 are to be provided for the operation of the device as is conventional.

The device of the invention includes the advantages of eliminating the interface between the magnetic member and peripheral circuitry, close proximity of sensors and sense amplifiers, increased reliability, no problem of alignment of the magnetic sheet, ease of manufacture and packaging and compatibility with current silicon technology.

While the invention has been particularly shown and described with reference to preferred embodiments thereof, it will be understood by those skilled in the art that the foregoing and other changes in form and details may be made therein without departing from the spirit and scope of the invention.

We claim:

1. A magnetic bubble memory comprising a magnetic member, means providing a magnetic bias field oriented perpendicular to the plane of said magnetic member, means providing a rotating magnetic switching field oriented in the plane of said magnetic member, a semiconductor member carrying said magnetic member and attached thereto in a laminar manner, means to form magnetic domains in said magnetic member, said domains representing data to be stored in said memory, a permalloy path located between said semiconductor member and said magnetic member for propagating said domains, sensing means formed in said semiconductor member for sensing the presence of said domains and for producing an electric signal when the presence of a domain is sensed, amplifying means for amplifying said signals to produce an amplified output signal corresponding to sensed data in said memory, a random access semiconductor memory formed in said semiconductor member and operably connected to said magnetic bubble memory, and a shield placed over the active portion of said semiconductor member.

2. The device of claim 8 wherein said means for sensing comprises a magneto-resistive device.

3. The device of claim 8 wherein said means for sensing comprises a Hall effect device.

* * * * *

PO-1050
(5/69)

UNITED STATES PATENT OFFICE
CERTIFICATE OF CORRECTION

Patent No. 3,786,445 Dated January 15, 1974

Inventor(s) Irving T. Ho and Jacob Riseman

It is certified that error appears in the above-identified patent and that said Letters Patent are hereby corrected as shown below:

Column 4, Line 15 "8" should be --1--

Column 4, Line 17 "8" should be --1--

Signed and sealed this 3rd day of December 1974.

(SEAL)
Attest:

McCOY M. GIBSON JR.
Attesting Officer

C. MARSHALL DANN
Commissioner of Patents